May 16, 1967
T. C. TREMBLAY
3,319,485
HANDLES FOR SIGNAL SWITCHES
Filed July 28, 1966
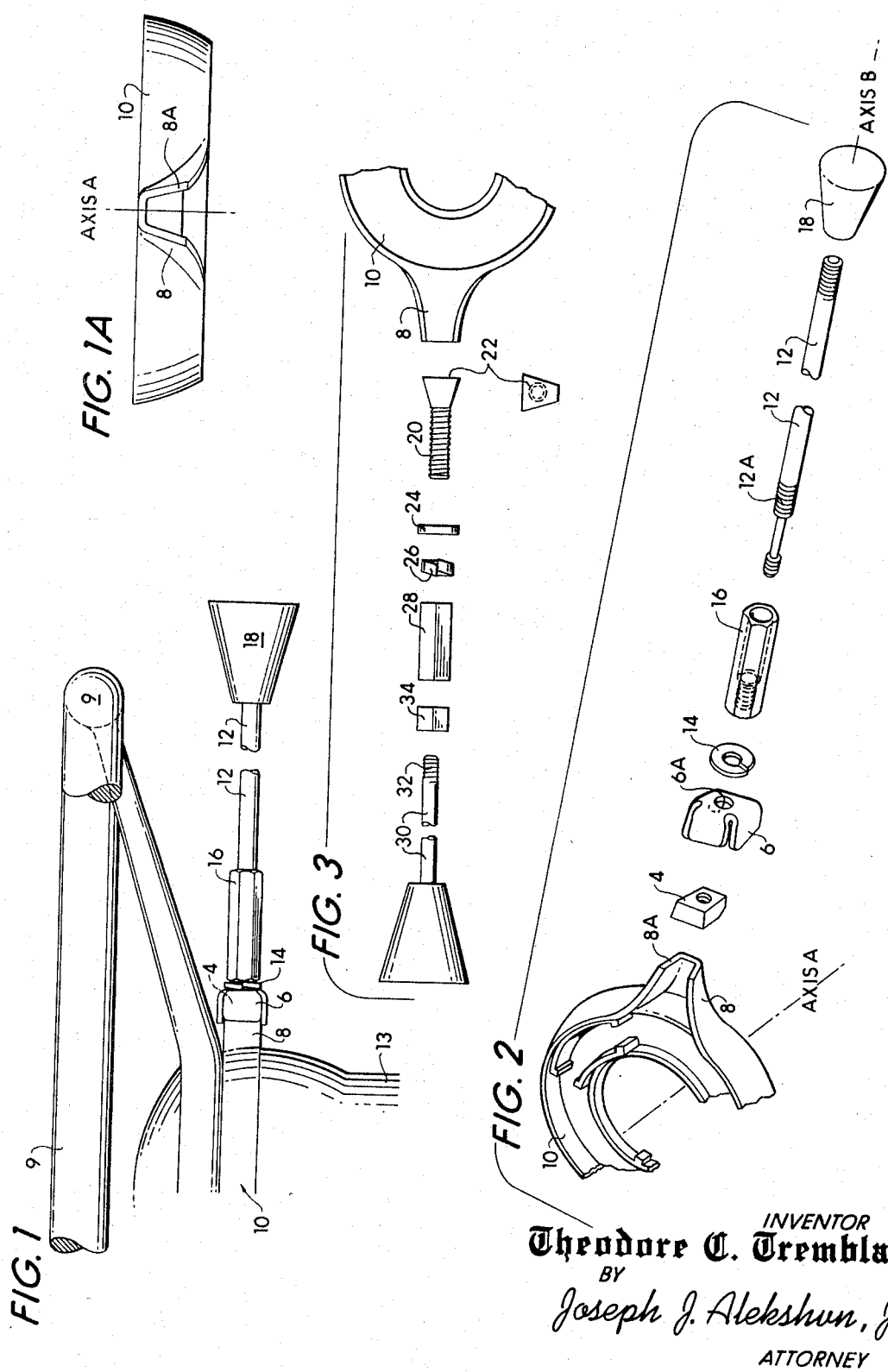
INVENTOR
Theodore C. Tremblay
BY
*Joseph J. Alekshun, Jr.*
ATTORNEY

United States Patent Office 3,319,485
Patented May 16, 1967

3,319,485
HANDLES FOR SIGNAL SWITCHES
Theodore C. Tremblay, 56 Great Road,
Bedford, Mass. 01730
Filed July 28, 1966, Ser. No. 568,467
12 Claims. (Cl. 74—543)

This application is a continuation-in-part of my co-pending application Serial No. 347,140 filed Feb. 25, 1964 now abandoned.

This invention relates generally to signal switches and more particularly to replacement handles for the directional signal switches of certain automobiles.

In certain automobiles, particularly the Volkswagen automobile, the signal switch housing and its handle, instead of being screw fastened, are die cast into a single unit. Consequently, when, through repeated use, the handle fractures, the whole switching unit must be replaced even though the switch itself may yet be in good condition. The switch housing is directly under the steering wheel. Thus, in making a replacement, the horn, steering wheel, and switch are removed and the coupling wires disengaged from the housing. After a new switch is installed, the above components are reassembled and the wires reconnected to the housing. It follows that such a procedure is expensive in comparison to the cost of a simple handle because of the need of an entire new switching unit and the labor involved in making the repair.

In view of the unnecessary expense incurred in repairing switches with broken handles, applicant has, as a primary object of his invention, to provide apparatus for making such repairs at reduced labor and expense.

Another object of the invention is to provide a replacement handle that may be readily and securely coupled to directional signal switches.

It is a further object of the invention to provide a replacement handle that is of simple and inexpensive construction.

It is a further object of the invention to provide a replacement handle that is easy to manufacture.

It is a further object of the invention to provide a replacement handle that may be securely coupled to switches having tapered housings.

It is a still further object of the invention to provide a replacement handle that is particularly adapted for use in Volkswagen automobiles.

These and other objects of the invention will become apparent from the following description taken in conjunction with the accompanying drawings of which:

FIG. 1 is a side view of the top portion of a Volkswagen steering wheel column assembly incorporating the replacement signal switch handle of the present invention;

FIG. 1A illustrates the dove-tail shaped portion of the switch mount of FIG. 1 absent the replacement handle;

FIG. 2 is an exploded perspective view of the signal handle of FIG. 1 inverted to illustrate design details; and FIG. 3 is an exploded top view of an alternate coupling joint for the replacement handle.

Illustrated in FIG. 1 is the top portion of a conventional Volkswagen steering column assembly, comprising steering wheel 9 and directional signal switch housing 10 concentric with and secured to column 13. As illustrated in FIG. 1A, a portion of the handle side of switch housing 10 is shaped in the form of a compoundly tapered hollowed female dovetail 8. It is somewhere along this tapered dovetail that fracture of the handle of housing 10 ordinarily occurs. Consequently, after the fractured cast handle is removed, the new handle in accordance with the current invention is to be suitably coupled to dovetail 8 after its face 8A is smoothened.

A preferred replacement handle is shown in FIG. 2. It comprises shaft 12 having a thread 12A somewhere along its length, and a compoundly tapered headnut 4 screw-fastened or otherwise secured to one end of shaft 12 as by press-fit or weld. One taper in nut 4 is in the direction of axis A and another in the direction of axis B so that the sides of nut 4 substantially conform to the compoundly tapered shape in the corresponding inner surfaces of hollow dovetail 8. The front edge of nut 4 may also be beveled to avoid interference with a round in the inner rim of housing 10. The coupling also comprises a pressure means such as clamp 6 which is tapered in the direction of axis A to conform essentially with the shape of the outer surface of dovetail 8, washer 14, a partially threaded coupling nut 16 which rides along threads 12A and end knob 18.

As also illustrated in the inverted view of FIG. 2, when shaft 12 of the handle is combined with housing 10, nut 4 becomes essentially nested against the inside of dovetail 8. Also flat 6A of clamp 6 contacts face 8A of the dovetail, and the bottom of the clamp, which is the wider end of the taper, covers the open bottom of the dovetail, and the narrower top of clamp 6 covers the top surface of the dovetail. The taper in the clamp thus allows the sides to register against the external sides of the dovetail. Clamp 6 is also recessed along the corners so the sides of the clamp may be shaped to provide clamping action and to follow the taper in dovetail 8 in the direction of the longitudinal axis B of shaft 12.

The handle is secured when coupling nut 16 is tightened causing the contacting portions of clamp 6 to exert pressure against the face and outer surfaces of the dovetail, and for headnut 4 to nest firmly or wedge against the internal surfaces thereof. This wedging action accommodates any slight variations between the shapes of the dovetail and the nut. The unthreaded portion of coupling nut 16 allows nut 16 to ride far enough back along shaft 12 to facilitate installation of the handle.

An alternative handle is shown in FIG. 3. It comprises male screw 20 having a wedge-shaped nut 22 affixed in any manner to one end, and a pressure means in the form of flat washer 24 and lock washer 26 bounded by coupling nut 28 with longitudinal threads riding on screw 20. The coupling is made and secured by placing screw 20 and nut 22 under and up into hollow dovetail 8 and by subsequently tightening nut 28 so that nut 22 wedges firmly into dovetail 8. Again the wedging action provides securement despite any variances between the shapes of nut 22 and hollow dovetail 8. A handle shaft 30 having end threads 32 is incorporated in the handle by use of check nut 34 in engagement with thread 32 and screw 20.

While replacement handles have been shown in conjunction with a signal switch housing of a Volkswagen automobile, the invention is not intended to be limited to the exact constructions described. Various modifications may be made and yet remain within the principles demonstrated. For example, the principles disclosed may be applied to join handles to switch housings having a hollowed taper of a different shape. To cover these and other variations that may be made and are still within the spirit of the invention, the invention is now defined in the appended claims.

I claim:
1. A replacement handle for engagement with a hollow tapered portion of a housing of a signal switch, said tapered portion having an inner surface, an outer surface and an end face comprising, in combination, a shaft, a nut secured to said shaft near one of its ends and wedged against the inner surface of said tapered portion of said housing, a clamp exerting pressure against said face and said outer surface of said tapered portion, and a coupling nut riding along said shaft exerting a force against said clamp to secure said engagement.

2. A replacement handle as defined in claim 1 wherein the shape of the sides of said clamp substantially conforms with the shape of corresponding sides of said outer surface of said tapered portion of said housing.

3. A replacement handle as defined in claim 2 wherein the shape of the sides of said nut substantially conforms with the shape of corresponding sides of said inner surface of said tapered portion of said housing.

4. A replacement handle for engagement with the hollow dovetail portion of the directional signal switch in a Volkswagen automobile comprising, in combination with said dovetail portion, a shaft, a nut secured near one of its ends and nested firmly against the inner surface of said dovetail portion, pressure means disposed about said shaft exerting pressure against said dovetail portion, and a coupling nut riding on said shaft exerting a force against said pressure means to secure said engagement.

5. A replacement handle as defined in claim 4 wherein said pressure means comprises a clamp exerting pressure against the face of said dovetail portion, the sides of said clamp shaped to substantially conform with the shape of corresponding sides of the external surface of said dovetail portion and exerting pressure against said external surface.

6. A replacement handle as defined in claim 5 wherein the shape of the sides of said nut substantially conforms with the shape of corresponding sides of the inner surface of said dovetail portion.

7. A replacement handle as defined in claim 6 wherein a lock washer resides between said clamp and said coupling nut, and wherein said shaft has threads, and wherein the forward portion of said coupling nut has internal threads in engagement with said threads on said shaft.

8. A replacement handle as defined in claim 4 wherein said nut is wedged-shaped.

9. A replacement handle as defined in claim 8 wherein said pressure means comprises a washer contacting the face of said dovetail portion and wherein tightening of said coupling nut causes said wedged-shaped nut to move forward and become wedged against the inner surface of said dovetail portion.

10. A replacement handle as set forth in claim 9 wherein said coupling nut is of sufficient length to receive a threaded handle shaft and a check nut to secure said handle shaft.

11. A replacement handle adapted for use with a signal switch having a housing with hollow tapered portion comprising in combination, a shaft having first and second ends, a tapered head nut secured to said shaft near said first end, a tapered clamp, and a coupling nut on said shaft for exerting pressure on said clamp in the direction of said first end of said shaft.

12. A replacement handle as defined in claim 11 wherein said headnut and clamp have compound tapers, and said shaft has threads upon which said coupling nut rides.

No references cited.

FRED C. MATTERN, Jr., *Primary Examiner.*

C. F. GREEN, *Assistant Examiner.*